United States Patent [19]

Ueyoko et al.

[11] Patent Number: 5,188,686
[45] Date of Patent: * Feb. 23, 1993

[54] HIGH SPEED TIRE FOR HEAVY DUTY VEHICLES INCLUDING BEAD PART WITH SIDE PACKING RUBBER

[75] Inventors: Kiyoshi Ueyoko, Osaka; Hideaki Yoshikawa, Kobe; Mikio Takatsu, Takarazuka, all of Japan

[73] Assignee: Sumitomo Rubber Industries, Ltd., Kobe, Japan

[ * ] Notice: The portion of the term of this patent subsequent to Nov. 3, 2009 has been disclaimed.

[21] Appl. No.: 634,596

[22] Filed: Dec. 27, 1990

[30] Foreign Application Priority Data

Dec. 29, 1989 [JP] Japan ................................ 1-341267

[51] Int. Cl.$^5$ .......................... B60C 3/00; B60C 3/04; B60C 15/06
[52] U.S. Cl. .................................. 152/454; 152/525; 152/543; 152/547
[58] Field of Search ................ 152/454, 525, 543, 547

[56] References Cited

U.S. PATENT DOCUMENTS

| | | | |
|---|---|---|---|
| 4,214,620 | 7/1980 | Mezzanotte | 152/454 X |
| 4,244,414 | 1/1981 | Uemura et al. | 152/459 X |
| 4,815,511 | 3/1989 | Brayer et al. | 152/454 X |

FOREIGN PATENT DOCUMENTS 61-132401 6/1986 Japan ................................. 152/454

*Primary Examiner*—Michael W. Ball
*Assistant Examiner*—Adrienne C. Johnstone

[57] ABSTRACT

A high speed tire for heavy duty vehicles comprise a belt layer of a carcass with radial structure, wherein a profile of the outer circumference of the tire in the specified internal pressure state satisfies that the maximum width and radius ratio Ro/W is not more than 0.54. At this point, the ratio Ro/W is defined as the ratio of the radius Ro of curvature of the arc which passes through maximum width point C, a reference point Q and an intermediate height point M to tire maximum width W. The maximum width point C is defined as a point where the tire width is maximum W. The reference point Q is defined as a point which is apart from the bead bottom line by the length of 0.2 times the total sectional height H of the tire. And the intermediate height point M is defined as a point which is intermediate between the maximum width point C and the reference point Q.

1 Claim, 4 Drawing Sheets

HIGH SPEED TIRE FOR HEAVY DUTY VEHICLES INCLUDING BEAD PART WITH SIDE PACKING RUBBER

BACKGROUND OF THE INVENTION

Recently, in tires used in heavy duty and high speed conditions such as aircraft tires, the radial structure is employed for the purposes of structural durability, running performance and fuel consumption. In such aircraft tires, however, since they are used in the conditions of high internal pressure, heavy load and high speed, a greater durability is required as compared with tires used in other fields. Especially the bead part is likely to be peeled or damaged in the carcass end part, and its vicinity, due to the strain caused by bending deformation by a large load at the time of taking off or landing. Therefore, it was hitherto attempted to suppress bending deformation by enhancing the bead rigidity, by increasing the bead volume, or using a reinforcement layer made of organic or inorganic fiber cords.

In such rigidity reinforcing measures, however, the internal heat generation due to bending deformation cannot be decreased, and satisfactory prevention of bead part damage could not be obtained.

SUMMARY OF THE INVENTION

The present inventors accordingly accumulated various studies about the bending deformation of the bead part by employing takeoff taxi simulation tests and others conforming to the United States Federal Aviation Administration Technical Standard Order TSO-C62c. As a result, comparing the tire bead part A0 without load and the tire bead part A1 with specified load as shown in FIG. 3, as being mounted on normal rim R and inflated with a normal internal pressure, it has been found that (1) the bead part A1 deforms almost in a specific shape without being influenced by the profile of the bead part A0, and (2) the internal heat generation of the bead part is lower when the bead deformation h0-h1 is smaller, which is the difference between the initial height h0 and the loaded height h1, or the length between the outer surface of the bead parts A0, A1 on the vertical line set up from the outer edge of, for example, rim flange Ra, and the upper edge of the rim flange Ra as shown in FIG. 4. It is also known that the heat generation of the bead part is rather increased when the rigidity is increased by increasing the thickness of the bead parts, especially the clinch thickness which is the thickness in the flexural part, in order to decrease the bead deformation h0-h1.

As a result of further study the present inventors discovered that the initial height h0 can be preliminarily reduced by defining the radius of curvature of the tire outer circumference below the maximum width point of the tire to form a downward swollen shape, thereby decreasing the bead deformation h0-h1, so that the bead part durability may be enhanced while suppressing the bead part heat generation.

It is hence a primary object of the invention to present a high speed tire for heavy duty vehicles capable of decreasing the bead part bending deformation and bead heat generation so as to suppress bead damage.

According to one aspect of the invention, a high speed tire for heavy duty vehicles comprises a carcass in radial structure extending from a tread part through side wall parts and folded at each edge around a bead core of a bead part, and a belt layer disposed radially outside said carcass. Further more, in a profile of the outer circumference of a tire on the tire section including the tire axis when the tire is mounted on a normal rim and inflated with a normal internal pressure, the maximum width and radius ratio (Ro/W) is not more than 0.54. At this point, the maximum width and radius ratio (Ro/W) is defined as a ratio of the radius (Ro) of curvature of the arc which passes through the maximum width point (C) where the tire width is the maximum (W), the reference point (Q) radially outward from the bead bottom line by a length of 0.2 times the sectional height (H) of the tire, and the intermediate height point (M) which has intermediate height between the maximum width point (C) and the reference point (Q), to the tire maximum width (W).

The profile of the outer circumference of the tire is swollen downward by defining the maximum width and radius ratio Ro/W, as the ratio of the radius Ro of curvature of the arc passing through the maximum width point C, reference point Q and intermediate height point M to the maximum width W as 0.54 or less. As a result, without having to modify the tire structure or lower the running performance, the tire comes to have a smaller initial height h0 in the bead part without load. On the other hand, the a loaded height h1 of the bead part in loaded state is nearly constant, and hence the tire is decreased in bead deformation h0-h1. Therefore, the bead damage may be significantly suppressed by the decreasing effects of the bending stress and deformation heat generation owing to the decrease of the bead deformation h0-h1.

BRIEF DESCRIPTION OF THE DRAWINGS

Embodiments will be now be disclosed by way of example only in conjunction with the attached drawings, in which.

DESCRIPTION OF THE PREFERRED EMBODIMENTS

Figure 1:
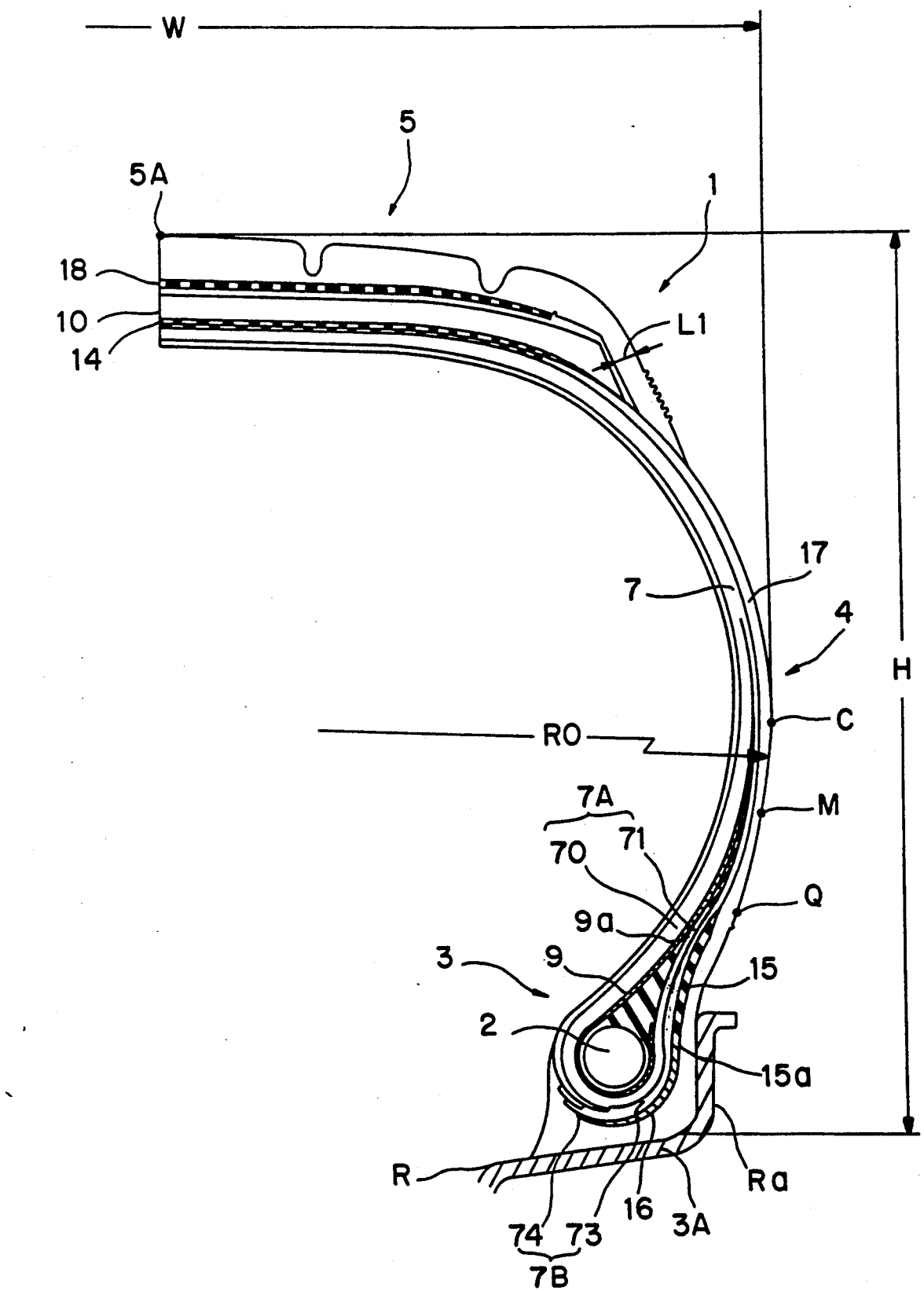
FIG. 1 is a sectional view showing an embodiment of the invention.

FIG. 1 shows the sectional view of a 46×17R20 radial tire for an aircraft which is mounted on a normal rim R and inflated with a normal internal pressure. In FIG. 1, a high speed tire for heavy duty vehicles 1 (hereinafter called tire 1) comprises a bead part 3 with an annular bead core 2 through it, a side wall part 4 contiguous to the bead part 3 and extending outward in the tire radial direction, and a tread part 5 which is linked between the outer ends of the two side wall parts 4.

In addition, the tire 1 also has a carcass 7 consisting of an inner layer 7A composed of plural, for example, four inner plies folded back around the bead core 2 from axially inside to outside of the tire, and an outer layer 7B composed of plural, for example, two outer plies enclosing the folded-back portion of the inner layer 7A from axially outside to inside of the tire.

The inner layer 7A has a folded-back part 71 for folding back around the bead core 2 at both ends of a toroidal main body part 70 passing through the tread part and side wall part. The outer layer 7B has a wrapping part 74 enclosing the folded-back part 71 from outside to inside of the bead core 2 at both ends of a toroidal main body part 73.

The inner plies and outer plies include, in this example, carcass cords of organic fiber cords, and the carcass cords are arranged in a radial direction having an inclination of 70 to 90 degrees to the tire's equator. And in this example, the carcass 7 has the carcass cords crossed and inclined alternately in the circumferential direction between adjacent carcass plies. As the organic fiber cords, rayon, polyester, vinylon, nylon, aromatic polyamide, and others may be used.

In addition, between the main body part 70 and the folded-back part 71 of the inner layer 7A of the carcass 7, there is a bead apex rubber 9 extending outward in the radial direction from the bead core 2. A side packing rubber 15 with a small thickness, extending inward and outward in the radial direction along the outer surface of the main body part 73 of the carcass 7, is provided in the bead part 3. The lower end 15a of the side packing rubber 15 is cut off at the upper end of the reinforcement filler 16 which extends on the bottom surface of the wrapping part 74. And the side packing rubber 15 is covered with a side wall rubber 17 which forms the outer side surface of the tire from the bead part 3 to the side wall part 4.

The tread part 5 has a belt layer 10 positioned radially outside the carcass 7. And in this embodiment, a cut breaker 14 is interposed between the belt layer 10 and the carcass 7.

The belt layer 10 is composed of plural, for example, eight, belt plies.

The cut breaker 14 is composed of, for example, two cut breaker plies. This cut breaker 14 runs along the carcass 7 in the middle part of the tread across the tire's equator, and is gradually spaced from the carcass 7 in its outward direction, and its outer end is terminated at the position of about 65 to 85% of the tire maximum width W, preferably, at a position in a range of about 70 to 78%.

The belt layer 10 further is superimposed on the cut breaker 14, and its outer end extends over the outer end of the cut breaker 14. And its outer end is aligned on the slope along the tire outer surface. The belt width is in a range of about 70 to 85% of the tire maximum width W, and the shortest distance L1 from the belt outer end to the tire outer surface is set in a range of about 3 to 15 mm.

The belt cords for forming the belt plies are made of elastic cords of low stretchability, and the belt cords are disposed parallel at an inclination of 0 to 20 degrees to the tire's equator.

The outer surface of the belt layer 10 is coated with a protective layer 18 for enhancing the cutting resistance.

In this invention, the tire meets the parameters that the maximum width and radius ratio Ro/W is not more than 0.54, in a profile of the outer circumference of the tire on the tire section including the tire axis when the tire is mounted on a normal rim and inflated with a normal internal pressure. At this point, the ratio Ro/W is defined as a ratio of a radius Ro of curvature of an arc which passes through a maximum width point C, a reference point Q and an intermediate height point M, to tire maximum width W. The maximum width point C is defined as a point where the tire width is maximum W. The reference point Q is defined as a point which is apart from the bead bottom line by 0.2 times the sectional height H of the tire height H being the distance from the bead bottom line to the highest position on the tread. And the intermediate height point M is defined as a point which has an intermediate height between the maximum width point C and the reference point Q.

Figure 2:
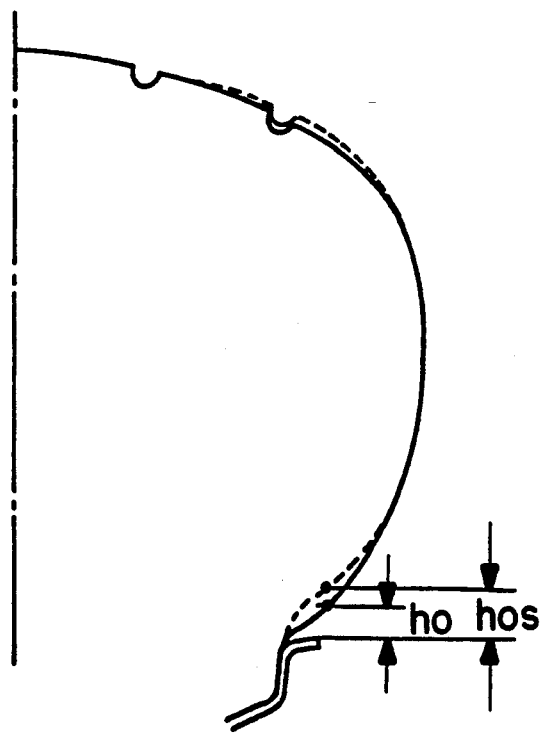
FIG. 2 is a diagram showing the tire of the Invention profile in comparison with the prior art.
Figure 3:
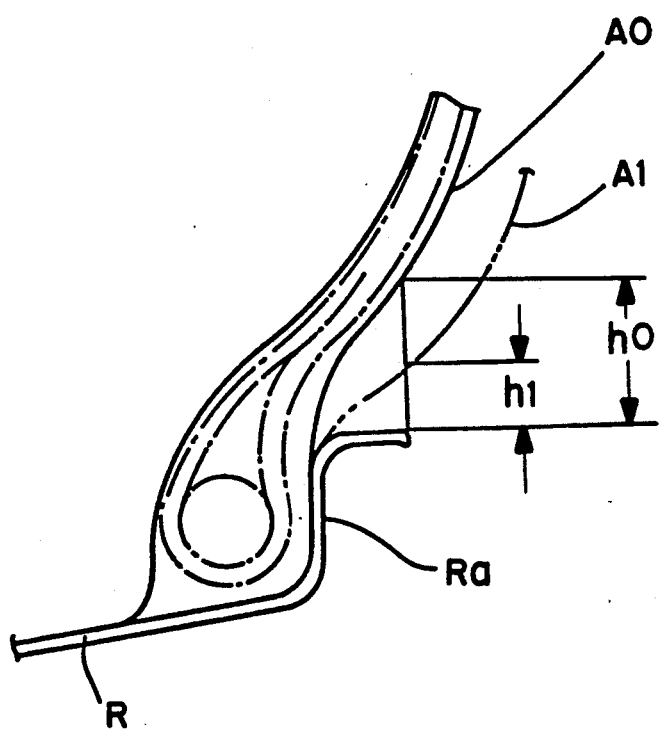
FIG. 3 is a schematic diagram showing the bending deformation state of the bead part.
Figure 4:
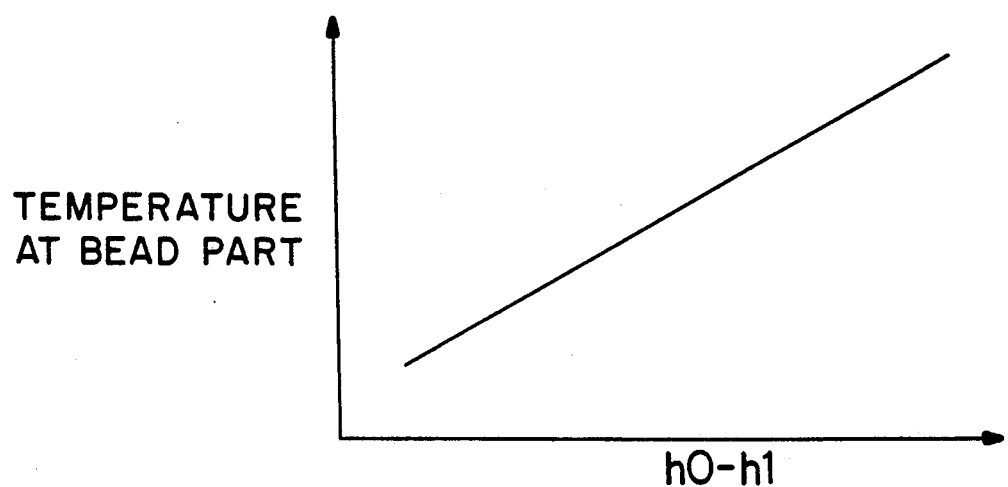
FIG. 4 is a diagram showing the relation between the bead outer surface heights h0, h1 and the bead part temperature.

By thus defining the maximum width and radius ratio Ro/W to be 0.54 or less, as indicated by solid line in FIG. 2, the tire profile is swollen downward as compared with the conventional tire indicated by a broken line. As a result, without modifying the tire structure and lowering the running performance, the initial height h0 of the bead part in an unloaded state is decreased from the initial height h0S of the conventional tire. On the other hand, the loaded height h1 of the bead part in the loaded state is nearly constant as mentioned above, and hence the tire 1 has the smaller bead deformation h0–h1. Accordingly, the bead damage may be significantly suppressed by the effects of decreasing the bending stress and deformation heat generation owing to the decrease of the bead deformation h0–h1.

However, if the maximum width and radius ratio Ro/W is set smaller than 0.31, the profile is excessively swollen downward, and the initial height h0 becomes too short. As a result, in a loaded state, the contact pressure with the rim flange Ra increases, and rim chamfering is likely to occur. Besides, the increase of contact pressure causes elevation of the bead part temperature. Thus, the preferable range is 0.31 to 0.54, and more preferably, 0.4 to 0.5.

Hence, by adequately reducing the bead deformation h0–h1, lowering the bending stress and deformation heat generation, bead damage may be significantly prevented.

In this embodiment, meanwhile, the 100% modulus MP of the side packing rubber is 53 to 95 kg/cm$^2$, the 100% modulus MA of the bead apex rubber is 78 to 120 kg/cm$^2$, and the 100% modulus MS of the side wall rubber is 14 to 50 kg/cm$^2$, and the modulus of MP, MA, and MS are in the relation of MS<MP<MA, and accordingly the step difference of rigidity is decreased while enhancing the rigidity, and the shearing stress is lessened and the bead part durability is improved.

EXAMPLES

Aircraft tires having the tire structure as shown in FIG. 1 in the tire size of 46×17R20 were fabricated according to the specification in Table 1. And these trial tires were presented to measurement of bead part temperature in the condition of 50 cycles H/S in accordance with the United States Federal Aviation Administrative Technical Standard Order TSO-C62c. The results are shown in the same table.

In this table, the bead heat generation index is expressed by dividing the temperature difference of the mean temperature after running 50 cycles in takeoff simulation test of TSO-C62c and the bead temperature before the start of each test, by the bead temperature before start.

As shown in the table, the tires of the invention are found to be capable of reducing the bead part heat generation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE 1

|  | Embodiment 1 | Embodiment 2 | Embodiment 3 | Embodiment 4 | Embodiment 5 | Embodiment 6 | Reference 1 | Reference 2 | Reference 3 |
|---|---|---|---|---|---|---|---|---|---|
| RO/W | 0.486 | 0.412 | 0.412 | 0.411 | 0.432 | 0.536 | 0.584 | 0.585 | 0.560 |
| Bead heat generation index | 0.83 | 0.98 | 0.90 | 0.76 | 0.95 | 1.05 | 1.17 | 1.05 | 1.15 |

What is claimed is:

1. A high speed tire for heavy duty vehicles comprising
   a carcass (7) in radial structure composed of a plurality of inner plies and a plurality of outer plies, said inner plies having a main body part (70) extending from a tread part (5) through a pair of side wall parts (4) to a bead core (2) in each of two bead parts (3) and a pair of folded-back parts (71), one of said pair of folded-back parts being folded back at each edge of the main body part (70) around each of the bead cores (2) from axially inside to outside, said outer plies having a main body (73) extending from the tread part (5) through said pair of side wall parts (4) to each of said bead cores (2) and a pair of wrapping parts (74), one of said pair of wrapping parts being folded back at each edge of the main body (73) to enclose one of the folded-back parts (71) around each of the bead cores (2) from axially outside to inside;
   a belt layer (10) disposed radially outside said carcass (7);
   a pair of tapered bead apex rubbers (9), one of said pair of apex rubbers (9) being disposed to extend outward in the radial direction from each of the bead cores (2) between the main body part (70) and each of the folded-back parts (71);
   a pair of side packing rubbers (15), one of said pair of side packing rubbers (15) extending along an outside surface of the main body (73) outward in the radial direction from each of said bead cores (2);
   a pair of reinforcement fillers (16), one of said pair of reinforcement fillers (16) being disposed on a radially bottom surface of each of said pair of wrapping parts (74) and extending axially outward and then radially outward to terminate at a lower end of said side packing rubber; and
   a pair of side wall rubbers (17), one of said pair of side wall rubbers covering an axially outer surface of each of said pair of said packing rubbers (15) from each of said bead parts (3) to one of the pair of side wall parts (4) so as to form an outside surface of the tire;
   wherein, in a profile of the outer circumference of a tire on the tire section including the tire axis when the tire is mounted on a normal rim and inflated with a normal internal pressure,
   the maximum width and radius ratio (Ro/W) of the radius (Ro) of curvature of the arc which passes through the maximum width point (C) where the tire width is the maximum (W), the reference point (Q) being radially outward from the bead bottom line by the length of 0.2 times the sectional height (H) of the tire, and the intermediate height point (M) which has intermediate height between the maximum width point (C) and the reference point (Q), to the tire maximum width (W) is not more than 0.54, and
   the 100% modulus MP of the side packing rubber (15) is 53 to 95 kg/cm$^2$,
   the 100% modulus MA of the bead apex rubber (9) is 78 to 120 kg/cm$^2$,
   the 100% modulus MS of the side wall rubber (17) is 14 to 50 kg/cm$^2$, and
   said modulus MP, MA, and MS are in the relationship of MS<MP<MA.

* * * * *